United States Patent
Blümcke et al.

[11] Patent Number: 5,933,242
[45] Date of Patent: Aug. 3, 1999

[54] METHOD FOR THE OPERATION OF AN OPTO-ELECTRONIC SENSOR

[75] Inventors: Thomas Blümcke, Gutach; Kai Waslowski, Emmendingen; Daniel Kietz, Riegel, all of Germany

[73] Assignee: Sick AG, Waldkirch, Germany

[21] Appl. No.: 09/069,567

[22] Filed: Apr. 29, 1998

[30] Foreign Application Priority Data

Apr. 30, 1997 [DE] Germany .................. 197 18 391

[51] Int. Cl.⁶ .................................................. G01B 11/00
[52] U.S. Cl. ........................................... 356/394; 356/237
[58] Field of Search .................................. 356/394, 237

[56] References Cited

U.S. PATENT DOCUMENTS 5,841,543  11/1998  Guldi et al. .............................. 356/394

FOREIGN PATENT DOCUMENTS

| | | |
|---|---|---|
| 0224044 A2 | 6/1987 | European Pat. Off. . |
| 3005746 C2 | 10/1983 | Germany . |
| 3445793 A1 | 7/1985 | Germany . |
| 3409818 A1 | 9/1985 | Germany . |
| 3722600 C2 | 7/1990 | Germany . |
| 9010998 | 12/1990 | Germany . |
| 9017631 | 5/1991 | Germany . |
| 4113583 A1 | 10/1991 | Germany . |
| 4134960 A1 | 4/1993 | Germany . |
| 4141469 A1 | 6/1993 | Germany . |
| 4230061 A1 | 3/1994 | Germany . |
| 9400891 | 4/1994 | Germany . |
| 4312186 A1 | 10/1994 | Germany . |
| 4342590 C2 | 6/1995 | Germany . |
| 4419364 A1 | 12/1995 | Germany . |

*Primary Examiner*—Robert H. Kim
*Assistant Examiner*—Reginald A. Ratliff
*Attorney, Agent, or Firm*—Townsend and Townsend and Crew LLP

[57] ABSTRACT

The invention relates to a method of operating an opto-electronic sensor, in particular a light barrier, in which a light signal is transmitted by means of a light transmitter into a monitored region and a light receiver designed to receive transmitted and reflected light signals delivers a signal, the amplitude of which is investigated for the presence of an object in the monitored region, wherein an object detection signal is transmitted when an amplitude threshold value is exceeded or fallen short of, wherein, before taking the sensor into operation, the threshold is automatically set in dependence on amplitude values which occur in a predetermined measurement time interval in the context of an initialization process with an object-free monitored region, and is thereby adapted to the operating conditions which exist during the initialization process, or wherein the threshold value is automatically adjusted during the sensor operation in dependence on amplitude values which have occurred in a specific measurement time interval and are thereby adapted to the respectively prevailing operating conditions.

22 Claims, 4 Drawing Sheets

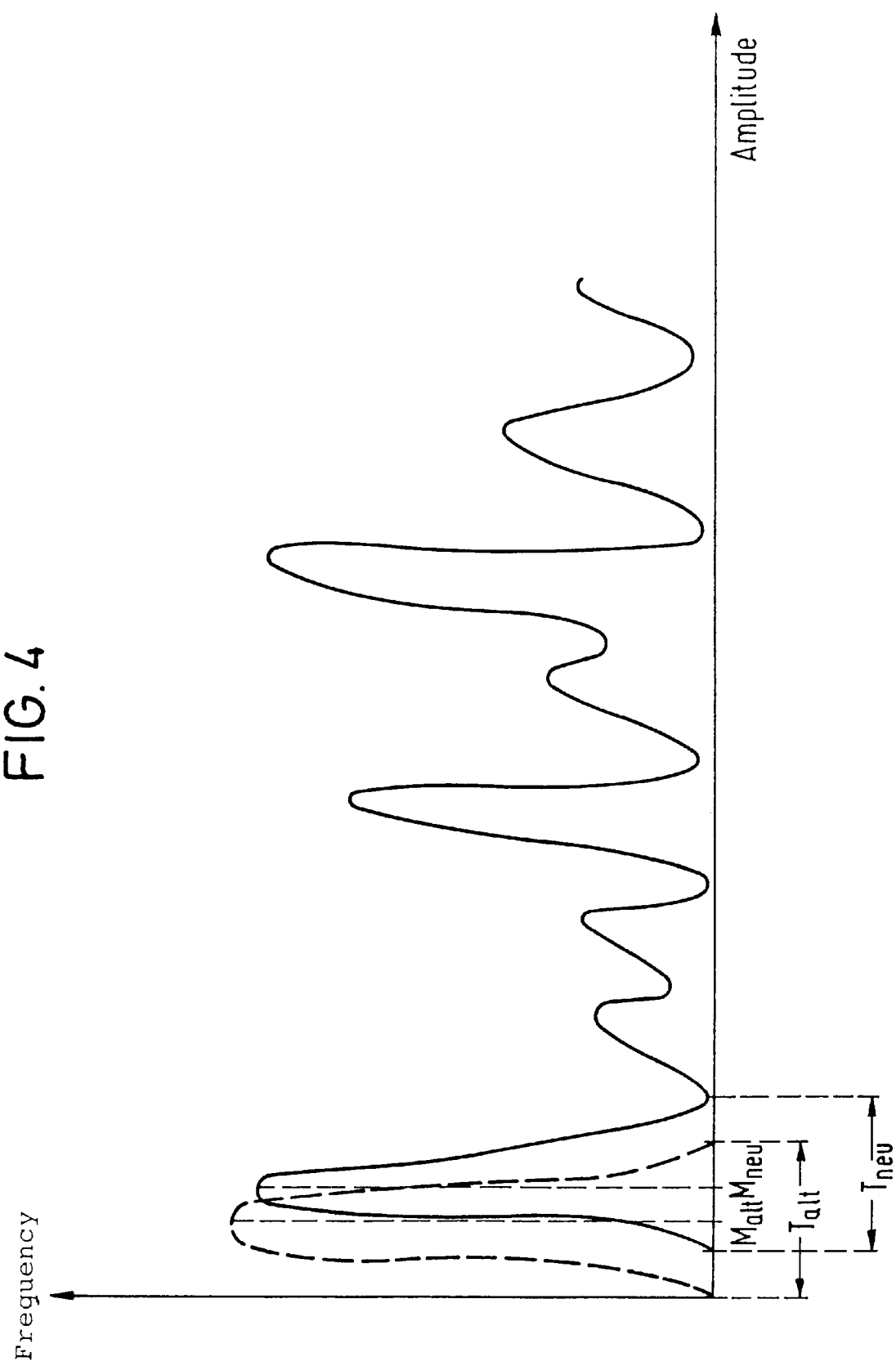

METHOD FOR THE OPERATION OF AN OPTO-ELECTRONIC SENSOR

FIELD OF THE INVENTION

The invention relates to a method of operating an opto-electronic sensor, in particular a light barrier, in which a light signal is transmitted by means of a light transmitter into a monitored region and a light receiver designed to receive transmitted and reflected light signals delivers a signal, the amplitude of which is investigated for the presence of an object in the monitored region, wherein an object detection signal is transmitted when an amplitude threshold value is exceeded or fallen short of.

DESCRIPTION OF PRIOR ART

It is important for the satisfactory functioning of such methods that the said amplitude threshold value is correctly set because it cannot be precluded, if the amplitude threshold value is inadequately set, that an article detection signal is transmitted although no object is present in the monitored region or that no article detection signal is transmitted although an object is present in the monitored region.

For the setting of the amplitude threshold value it is known for the user to set it to a suitable value, for example manually by means of a potentiometer, with a manual method of this kind naturally being subject to inaccuracies.

Furthermore, it is known, at least in accordance with internal prior art of the applicants, to use teach-in methods in which an object is introduced into the monitored region of the opto-electronic sensor, the signal amplitude which is received is evaluated with a factor and stored, and this stored value is used as a future amplitude threshold value.

The last named method has the disadvantage that the effort of introducing the object into the monitored region has to be made and it cannot be ensured, as a result of different characteristics of the objects that are introduced, for example as a result of different reflectivities, different distances from the sensor and also different geometrical shapes of the objects, that one always detects the relevant case for the setting of the amplitude threshold value in the context of the teach-in method.

Furthermore, it is a disadvantage that an amplitude threshold value once specified remains constant during the operating period of the sensor, and thus that operationally caused light power fluctuations, which are, for example, brought about by contamination or aging of the light transmitter, cannot be taken into account, so that faulty recognitions of objects in the monitored region can arise.

OBJECT OF THE INVENTION

An object of the invention consists in improving a method of the initially named kind in such a way that the most accurate determination of the amplitude threshold value possible, which takes account of the actual operation conditions present, is possible at the start of the operation and/or in that light performance fluctuations which occur during the operation of the sensor can also be compensated in a suitable manner.

BRIEF DESCRIPTION OF THE INVENTION

In accordance with a first principal for the solution in accordance with the invention, the part of the object concerned with the correct setting of the amplitude threshold value at the start of the sensor operation is solved in that, before taking the sensor into operation, the threshold is automatically set in dependence on amplitude values which occur in a predetermined measurement time interval in the context of an initialization process with an object-free monitored region, and is thereby adapted to the operating conditions which exist during the initialization process.

A distinction to the previously known method consequently consists in the fact that during the initialization process or during the first determination of the amplitude threshold value at the place of use of the sensor, no object must be introduced into the monitored region, so that the above explained sources of errors associated with the introduction of the test object are overcome. Moreover, an automatic setting of the threshold value is possible in accordance with the invention, so that operator errors can largely be precluded.

The threshold value to be determined in the context of the initialization process can be determined in accordance with the invention in that the frequency distribution of the amplitudes occurring during the measurement time interval is found, and the threshold value is defined by the maximum of the frequency distribution found. The measurement time interval corresponds essentially to the duration of the initialization process. Depending on the requirements, this measurement time interval can be set to a few seconds, or however, also to several minutes.

The said determination of the threshold value by means of a frequency distribution can be realized in simple manner with little complexity by the use of a microprocessor programmed with known algorithms, so that the economy of the method of the invention is not only determined by the fact that the procedure of introducing the test object into the monitored region is avoided, but rather additionally by the fact that the method of the invention can also be realized at low economic cost.

It is of advantage when a tolerance range surrounding the threshold value or the maximum of the found frequency distribution is determined, with the width of the tolerance range for example being dependent on the shape of the curve of the frequency distribution that is found in the region of the maximum. When the values of the frequency distribution lie in the vicinity of the maximum close to the maximum, the tolerance range can be selected to be relatively small. When the said values have a larger spacing from the maximum, then the tolerance range can be selected to be correspondingly larger.

The tolerance range is in the named case the determining factor for the transmission of an object detection signal, because the transmission of such a signal for example always takes place when an amplitude found during the operation of the sensor lies outside of the determined tolerance range.

The part of the object underlying the invention in relation to the compensation of operationally caused light power fluctuations, is satisfied in accordance with the invention in that the threshold value is automatically readjusted during the sensor operation in dependence on amplitude values which occur in a specific measurement time interval and is thereby adapted to the respectively prevailing operating conditions.

The threshold value is consequently not kept constant during the operation of the sensor, as in the method known from the prior art, but is rather individually reset in accordance with the respectively prevailing operating conditions.

A resetting or adaptation of the threshold value can in this respect be repeated during the sensor operation, for example in a constant time grid.

The adaptation of the threshold value takes place in dependence on amplitude values which have occurred in a specific measurement time interval and thus can be of a defined length which always ends at the time of the adaptation. In just the same way it is possible to so dimension the measurement time interval that all amplitudes are basically taken into account which have arisen between the taking into operation of the sensor and the respectively effective adaptation process.

It is preferred when the frequency distribution of the amplitudes which occur during the measurement time interval is found during the automatic resetting of the threshold value in accordance with the invention, and when a new or adapted threshold value is defined by the maximum of the frequency distribution found. Here, it is not necessarily the absolute maximum of the frequency distribution which is the determining factor, but rather—as a rule—the relative maximum in the region of a maximum previously determined is used. In this way the advantages already described above arise.

Furthermore, it is in this case also preferred if a tolerance range surrounding the respectively determined relative maximum of the respectively found frequency distribution is determined, with the width of the tolerance range in turn being specified in dependence on the shape of the curve of the frequency distribution that is found in the region of the maximum.

The tolerance range can in this case satisfy two functions:

On the one hand, an amplitude value found during the operation and lying outside of the tolerance range can in turn lead to the transmission of an article detection signal.

On the other hand, the carrying out of the method of the invention can be restricted to an adaptation of the threshold value to those cases in which a maximum of the frequency distribution found during sensor operation lies within the tolerance range determined in the context of the preceding adaptation process. In this way the said relative maximum can be determined and it is thereby ensured that no faulty adaptation is effected, since an adaptation always takes place only when an adapted threshold value that has been found only differs in specific limits from the previously found threshold value. If a larger deviation should occur, for example when a threshold value that has been found lies outside of the previously determined tolerance range, then the sensor can signal this, whereupon a new initialization of the sensor must be effected by the user. This initialization can then, for example, be effected in accordance with the initially described initialization process.

It is particularly advantageous if the two above described principles of solution are both jointly realized in a sensor, so that, on the one hand, the initialization of the sensor and, on the other hand, the resetting of the threshold value always takes place in accordance with the invention.

The method of the invention can, for example, be used in the operation of a reflex light barrier. A reflex light barrier is characterized in that the transmitted light signals are reflected to the light receiver, with an object-free monitored region, from a reflector arranged at the end of the monitored region opposite to the sensor.

Likewise it is possible to use the method of the invention in the operation of an energetic scanner. In an energetic scanner the transmitted light signals are not reflected to the light receiver with an object-free monitored region, because here no reflector is provided at the end of the monitored region. A reflection of the transmitted light signals takes place with an energetic scanner only then when a reflected objected to be recognized is present in the monitored region.

It is preferred if the methods of the invention are used for the recognition of clear glass.

Further preferred embodiments of the invention are set forth in the subordinate claims.

BRIEF LISTING OF THE FIGURES

The invention will be explained in the following with reference to embodiments and drawings, in which are shown:

FIG. 1 a frequency distribution found during an initialization process in a reflex light barrier, FIG. 2 a frequency distribution found during the operation of a reflex light barrier, FIG. 3 a frequency distribution found during an initialization process with an energetic scanner, and FIG. 4 a frequency distribution found during the operation of an energetic scanner.

DESCRIPTION OF PREFERRED EMBODIMENTS

Figure 1:
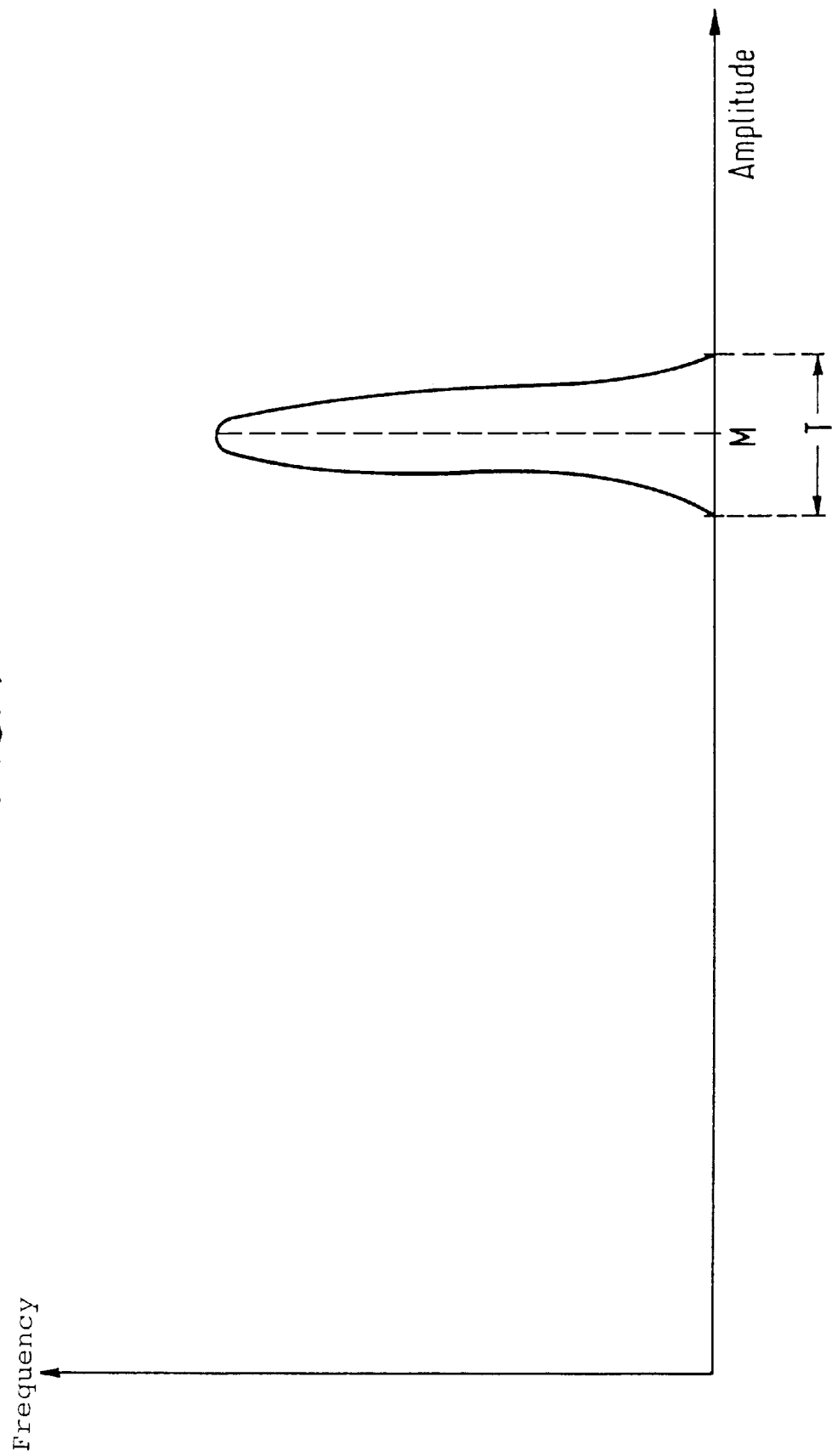

FIG. 1 shows that during an initialization process in accordance with the invention for a reflex light barrier, essentially only amplitudes in a relatively narrowly restricted range are found, with these amplitudes corresponding to the quantity of light which passes through reflection of the transmitted light at the reflector of the reflex light barrier back to the light receiver. This illustrates that during the operation of a reflex light barrier with an object-free monitored region a relatively large amount of light passes back to the light receiver, so that the amplitude that is found is comparatively high.

In accordance with the invention, the maximum M of the frequency distribution is then determined, which is surrounded by a tolerance range T likewise determined in accordance with the invention and the width of which depends on the shape of the curve of the frequency distribution in the region of the maximum M.

The maximum M and also the tolerance range T are stored in the sensor and an object detection signal is always transmitted during the operation of a sensor when an amplitude that is found lies outside of the tolerance range T, in particular when an amplitude that is found lies beneath the lower limit of the tolerance rang T.

During the operation of a reflex light barrier an object introduced into the monitored region as a rule causes a reduction of the quantity of the light received, because the object mainly reflects less well than the reflector provided at the end of the monitored region. Insofar a situation in which the signal falls short of the tolerance range is, as a rule, the determining factor for the transmission of an object detection signal.

Figure 2:
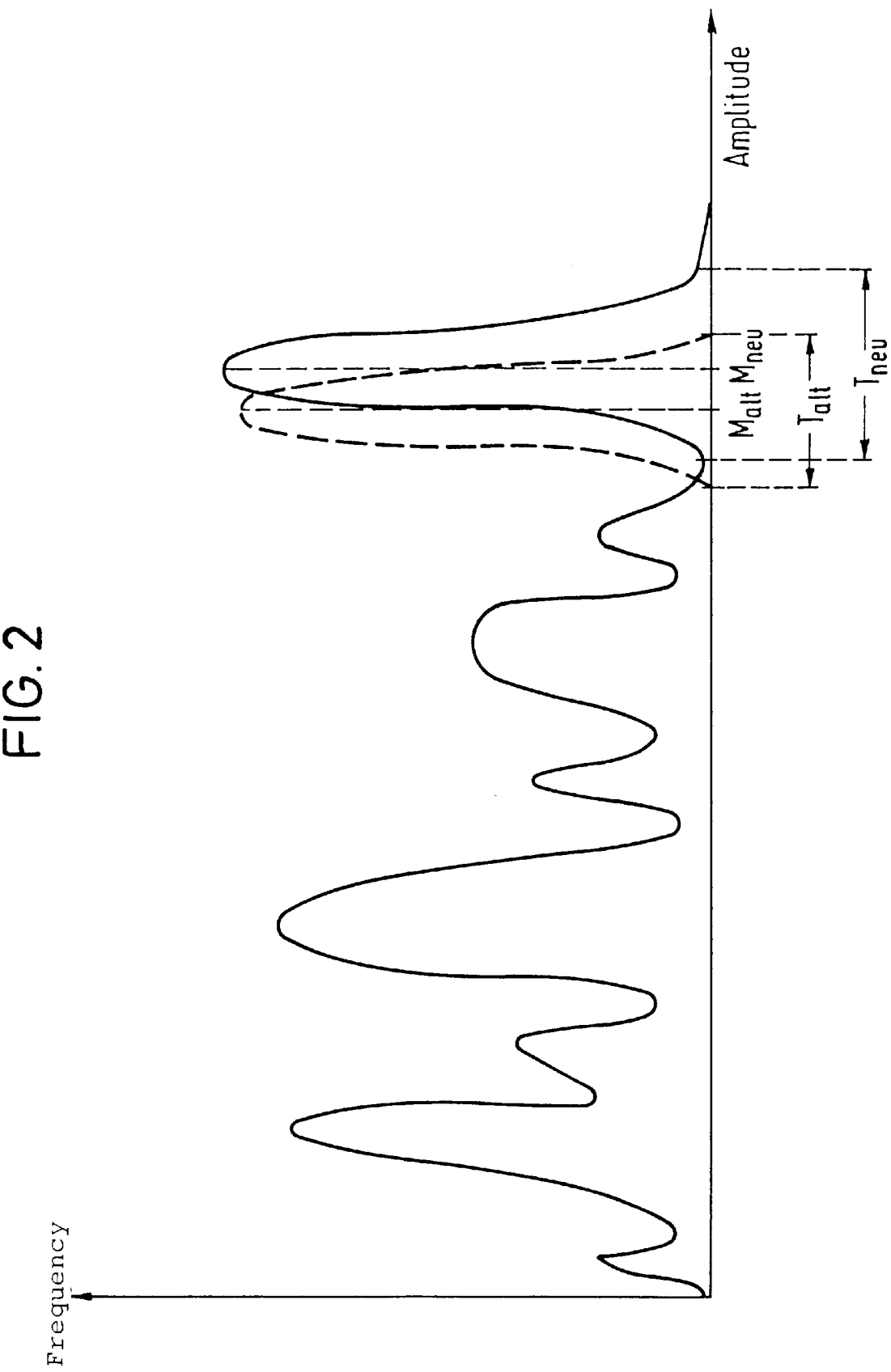

The frequency distributions shown in FIG. 2 illustrate the carrying out of a threshold adaptation method in accordance with the invention, which is, for example, carried out following an initialization process in accordance with FIG. 1.

The frequency distribution of FIG. 1, which was found in the context of the initialization process, is shown in broken lines in FIG. 2. This frequency distribution has, in accordance with FIG. 2, the maximum $M_{alt}$ and also the tolerance range $T_{alt}$ surrounding this maximum.

If now the sensor enters into operation after the conclusion of the initialization process, and the frequency distribution of the amplitudes occurring during this operation is found, then the shape of the curve drawn in in solid lines in FIG. 2 results, for example. This shape of the curve has a plurality of maxima, with the maximum $M_{neu}$ associated with the highest amplitude originating from reflections at the reflector of the reflex light barrier and the maxima which lie beneath this maximum $M_{neu}$ being attributable to reflections which were caused by objects introduced into the monitored region. In applications in which objects are normally present in the monitored region, the frequencies of the maxima produced by objects can be more pronounced or greater than the maximum brought about by the reflector. However, if, in accordance with the invention, one operates with the determination of a relative maximum, then the described method is also usable in this case without problem.

It is now investigated, in the context of the adaptation process of the invention, whether a maximum is present within the tolerance range $T_{alt}$. On detecting such a relative maximum, its position is determined and the corresponding amplitude $M_{neu}$ is stored as the new value which determines the threshold value. In addition, the tolerance range $T_{neu}$ which surrounds the new relative maximum $M_{neu}$ is specified, which is in turn dependent on the actual shape of the curve of the frequency distribution in the region of the maximum $M_{neu}$.

Thereafter, the previous values $M_{alt}$ and $T_{alt}$ are rejected, and the values $M_{neu}$ and $T_{neu}$ are stored as the new valid values, i.e. the transmission of an article detection signal always takes place after carrying out the described adaptation procedure when an amplitude determined during operation of the sensor lies outside of the tolerance range $T_{neu}$.

The described procedure can now be cyclically repeated, with the last determined maximum and tolerance range values in each case being the determining factor for the carrying out of the adaptation procedure.

Thus, a continuous shifting of the threshold value and of the tolerance range relevant for it, which determine the transmission of an article detection signal, is possible in accordance with changing operating conditions.

Should it be determined, in the context of an adaptation procedure, that no relative maximum can be found within the currently valid tolerance range, or should only maxima exist which lie outside of the tolerance range, then a new initialization process in accordance with FIG. 1 can, for example, be triggered or requested.

Figure 3:
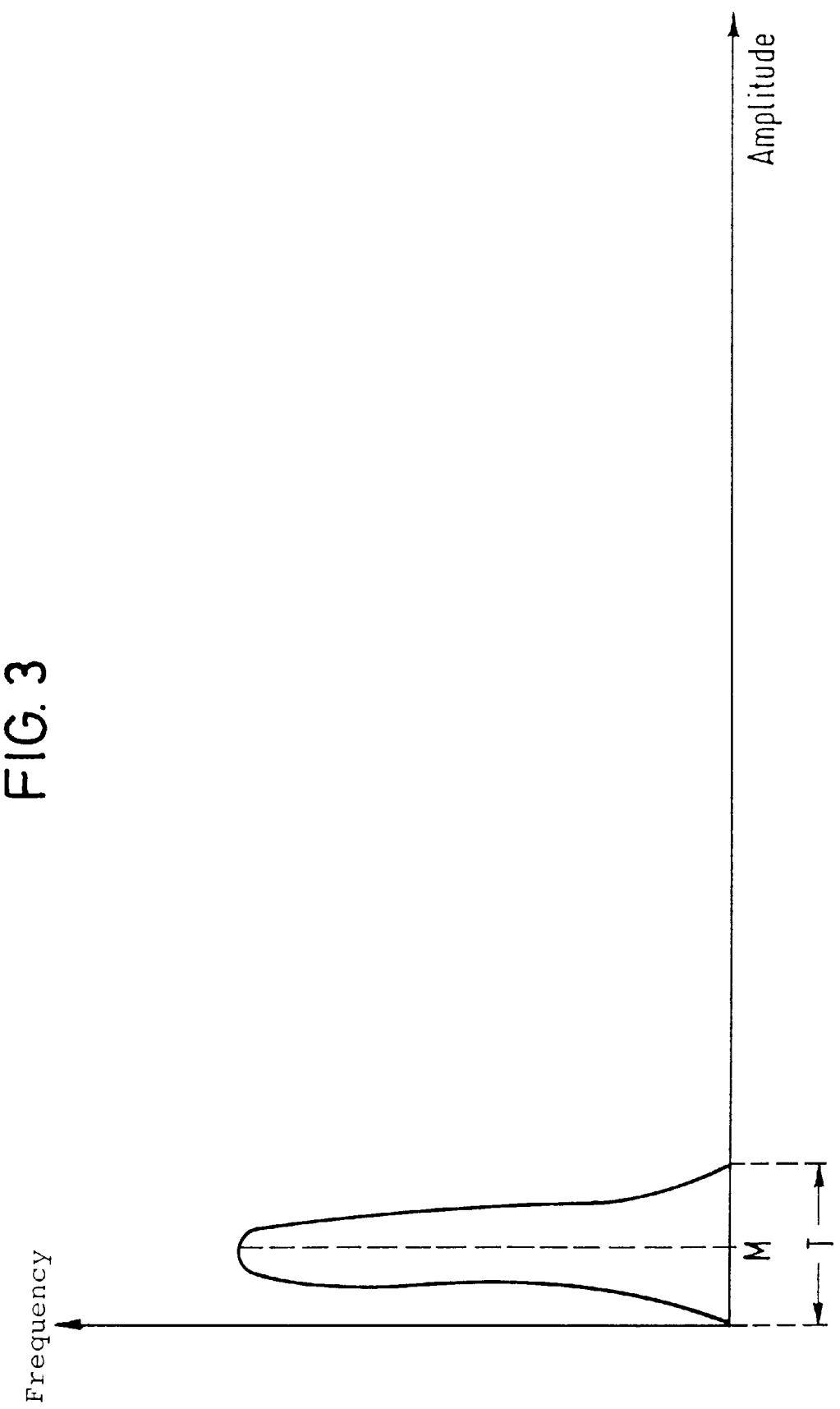

The illustrations in accordance with FIGS. 3 and 4 correspond substantially to the illustrations of FIGS. 1 and 2, with those frequency distributions being illustrated in FIGS. 3 and 4 which arise during the operation of an energetic scanner.

Since both the initialization process in accordance with FIG. 3 and also the adaptation process in accordance with FIG. 4 take place analogously to the initialization process in accordance with FIG. 1, and the adaptation process in accordance with FIG. 2, respectively, only the difference between the operation of a reflex light barrier in accordance with FIGS. 1 and 2 and the operation of an energetic scanner in accordance with FIGS. 3 and 4 will be described.

An energetic scanner receives essentially only very little light with an object-free monitored region, because no reflector is arranged at the end of the monitored region. Accordingly, the amplitudes found during an initialization process in accordance with FIG. 3 are significantly lower than the amplitudes found during an initialization process in accordance with FIG. 1. The amplitudes received in accordance with FIG. 3 originate essentially only from disturbing light and background reflections.

When objects are introduced into the monitored region of an energetic scanner, then a larger quantity of light is received as a rule than for an object-free monitored region, because the objects that are introduced reflect light to the light receiver. Thus, in accordance with an initialization process in accordance with FIG. 3, an article detection signal is given when an amplitude found during the operation of the sensor lies above the maximum M or above the tolerance range T.

Accordingly, the amplitudes found in accordance with FIG. 4 during the operation of the sensor, which are produced by reflection from objects, lie above the amplitudes found during the initialization process, i.e. above the amplitudes found with the object-free monitored region.

The adaptation process in accordance with FIG. 4, however, takes place in other respects in accordance with the adaptation process in accordance with FIG. 2, again with an object detection signal always being transmitted when a received amplitude lies above the tolerance range $T_{neu}$ after the adaptation process.

There are many different ways in which a satisfactory value for the range of tolerance T can be determined. It can, for example, simply be the base width of the frequency distribution curve obtained during initialization or during the adaptation process. It could also be selected to have a constant value. Alternatively, it can be selected to be a value obtained by dividing the area under the frequency distribution of the amplitudes obtained during initialization or during the adaptation process by the maximum amplitude of the frequency distribution or by this maximum amplitude multiplied by a suitable, preselected fraction, e.g. $M_{alt}/2$ or $M_{neu}/2$.

We claim:

1. Method of operating an opto-electronic sensor, in particular a light barrier, in which a light signal is transmitted by means of a light transmitter into a monitored region and a light receiver designed to receive transmitted and reflected light signals delivers a signal, the amplitude of which is investigated for the presence of an object in the monitored region, wherein an object detection signal is transmitted when an amplitude threshold value is exceeded or fallen short of, characterized in that before taking the sensor into operation, the threshold is automatically set in dependence on amplitude values which occur in a predetermined measurement time interval in the context of an initialization process with an object-free monitored region, and is thereby adapted to the operating conditions which exist during the initialization process.

2. Method in accordance with claim 1, characterized in that the frequency distribution of the amplitudes occurring during the measurement time interval is determined and the threshold value is defined by the maximum (M) of the determined frequency distribution.

3. Method in accordance with claim 2, characterized in that a tolerance range (T) surrounding the maximum (M) of the frequency distribution that is found is determined.

4. Method in accordance with claim 3, characterized in that the width of the tolerance range (T) is determined in dependence on the shape of the curve of the frequency distribution that is determined in the region of the maximum (M).

5. Method of operating an opto-electronic sensor, in particular a light barrier, in which a light signal is transmitted by means of a light transmitter into a monitored region and a light receiver designed to receive transmitted and reflected light signals delivers a signal, the amplitude of which is investigated for the presence of an object in the monitored region, wherein an object detection signal is transmitted when an amplitude threshold value is exceeded or fallen short of, characterized in that the threshold value is automatically adjusted during the sensor operation in dependence on amplitude values occurring in a specific measurement time interval and thereby adapted to the respectively prevailing operating conditions.

6. Method in accordance with claim 5, characterized in that an adaptation of the threshold value is repeated during the sensor operation in a constant time grid.

7. Method in accordance with claim 5, characterized in that the frequency distribution of the amplitudes occurring during the measurement time interval is determined, and the adapted threshold value is defined by the maximum (M) of the frequency distribution that is found.

8. Method in accordance with claim 5, characterized in that the measurement time interval corresponds to the total operating time of the sensor since an initialization process.

9. Method in accordance with claim 5, characterized in that a tolerance range (T) surrounding the maximum (M) of the frequency distribution that is found is determined.

10. Method in accordance with claim 9, characterized in that the width of the tolerance range (9) is determined in dependence on the shape of the curve of the frequency distribution that is found in the region of the maximum (M).

11. Method in accordance with claim 9, characterized in that an adaptation of the threshold value only takes place when a maximum ($M_{neu}$) found during the sensor operation lies within the previously determined tolerance range ($T_{alt}$).

12. Method in accordance with claim 9, characterized in that a new initialization process is triggered or requested when a maximum ($M_{neu}$) is found during the sensor operation outside of the previously determined tolerance range ($M_{alt}$).

13. Method in accordance with claim 1, characterized in that an article detection signal is only transmitted when an amplitude value found during the sensor operation lies above or below the specific tolerance range (T).

14. Method in accordance with claim 1, characterized by the features of one of the claims 5 to 13.

15. Method in accordance with claim 1, characterized in that, in the operation of a reflex light barrier, the transmitted light signals are reflected to the light receiver by a reflector arranged at the end of the monitored region opposite to the sensor.

16. Method in accordance with claim 1, characterized in that, in the operation of an energetic scanner, the transmitted light signals are not reflected to the light receiver with an object-free monitored region.

17. Use of a method in accordance with claim 1 for the recognition of clear glass.

18. Method in accordance with claim 5, characterized in that an article detection signal is only transmitted when an amplitude value found during the sensor operation lies above or below the specific tolerance range (T).

19. Method in accordance with claim 5, characterized by the features of one of the claims 5 to 13.

20. Method in accordance with claim 5, characterized in that, in the operation of a reflex light barrier, the transmitted light signals are reflected to the light receiver by a reflector arranged at the end of the monitored region opposite to the sensor.

21. Method in accordance with claim 5, characterized in that, in the operation of an energetic scanner, the transmitted light signals are not reflected to the light receiver with an object-free monitored region.

22. Use of a method in accordance with claim 5 for the recognition of clear glass.

* * * * *